US006294256B1

(12) United States Patent
Easter

(10) Patent No.: US 6,294,256 B1
(45) Date of Patent: *Sep. 25, 2001

(54) COMPOSITIONS AND ELECTRIC CABLES

(75) Inventor: Mark Richard Easter, Indianapolis, IN (US)

(73) Assignee: BICC General Cable Industries, Inc., Highland Heights, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,028

(22) PCT Filed: Nov. 12, 1997

(86) PCT No.: PCT/GB97/03098

§ 371 Date: Apr. 16, 1999

§ 102(e) Date: Apr. 16, 1999

(87) PCT Pub. No.: WO98/21278

PCT Pub. Date: May 22, 1998

(51) Int. Cl.[7] .............................. B32B 15/00; C08K 3/04; H01B 7/00

(52) U.S. Cl. .......................... 428/379; 428/372; 428/383; 524/495; 174/106 SC; 174/120 SC; 174/110 PM

(58) Field of Search ...................... 524/495; 174/106 SC, 174/120 SC, 105 SC, 110 PM, 120 SR; 428/372, 379, 383

(56) References Cited

U.S. PATENT DOCUMENTS 4,150,193 4/1979 Burns, Jr. .
4,226,823 10/1980 Jansson et al. .
4,246,023 1/1981 Savov et al. .
4,246,142 1/1981 Ongchin .
4,412,938 11/1983 Kakizaki et al. .
4,493,787 1/1985 Taniguchi et al. .
4,648,986 3/1987 Kotani et al. .
4,993,107 2/1991 Zoni .

FOREIGN PATENT DOCUMENTS 0 210 425 A2 2/1987 (EP) .
0 420 271 B1 4/1991 (EP) .
A-60-260637 12/1985 (JP) .

*Primary Examiner*—William Krynski
*Assistant Examiner*—J. M. Gray
(74) *Attorney, Agent, or Firm*—Blank Rome Comisky & McCauley LLP

(57) ABSTRACT

A composition of matter for use as dielectric shield in an electric power cable having insulation of XLPE, EPR or EPDM comprises: a base polymer which is a copolymer of ethylene with a mono-unsaturated ester; conductive carbon black in an amount to give the composition an electrical resistivity below 500 Am; and as an adhesion-adjusting additive, 1–20% by weight of the base polymer of a copolymer which consists essentially of ethylene and a comonomer having in its molecule at least one carbon-oxygen dipole, said copolymer having a molecular weight less than 20,000 Daltons but a melting point higher than 30° C. This new class of additive permits use of EVA's with lower vinyl acetate content than prior art additives and so enables the composition to have less rubbery physical properties.

15 Claims, No Drawings

COMPOSITIONS AND ELECTRIC CABLES

FIELD OF THE INVENTION

This invention relates to compositions of matter for use in making electric cables and to cables in which they are used. More particularly, it relates to compositions for use as "semiconducting" dielectric shield (also called core shield, dielectric screen or core screen) materials in power cables with crosslinked polymeric insulation, primarily at "medium" voltages, say from around 10 kV to 75 or perhaps 100 kV.

DESCRIPTION OF RELATED ART

While some customers desire to have polymeric cables in which the dielectric screen is securely bonded to the insulation so that stripping is only possible by use of a cutting tool that removes a little insulation with the shield, because they believe that this minimises risk of electrical breakdown at the interface, others prefer a "strippable" shield with limited adhesion to the insulation so that it can be peeled cleanly away (generally after cutting "tramlines" part-way through its thickness) without removing any insulation. Current strippable screen compositions for use over insulation of crosslinked polyethylene (XLPE) or one of the ethylene copolymer rubbers (EPR or EPDM, the latter incorporating a diene comonomer to provide unsaturation) are usually based on an ethylene/vinyl acetate copolymer (EVA) rendered conductive with an appropriate type and amount of carbon black: the required peel characteristics can be obtained by selecting an EVA with a high enough vinyl acetate content, with or without using a nitrile rubber as an adhesion-adjusting additive. Formulations using these additives (e.g. Ongchin U.S. Pat. Nos. 4,246,023 and 4,246,142, Burns et al European patent 0,420,271B, Kakizaki U.S. Pat. No. 4,412,938 and Jansson U.S. Pat. No. 4,226,823) are expensive proprietary material and in the present applicants' experience do not sufficiently avoid a requirement to use EVA's of relatively high vinyl acetate content to achieve the optimum adhesion level, with the result that all the strippable screen compositions in general commercial use are more rubbery than is desirable.

Many alternative adhesion-adjusting additives have been proposed, for example waxy aliphatic hydrocarbons (Watanabe et al U.S. Pat. No. 4,993,107); low-molecular weight ethylene homopolymers (Burns Jr U.S. Pat. No. 4,150,193); various silicone compounds (Taniguchi U.S. Pat. No. 4,493,787); chlorosulfonated polyethylene, ethylene-propylene rubber, polychloroprene, styrene-butadiene rubber, natural rubber, polyester rubber, and polyurethane rubber (all in Jansson U.S. Pat. No. 4,226,823); but none of these, except paraffin waxes, seems to have found commercial acceptance.

SUMMARY OF THE INVENTION

This invention is based on the discovery of a new and unexpected class of adhesion-adjusting additive which surprisingly allows shield compositions to be formulated, if desired, utilizing EVA's of lower vinyl acetate content for a given level of adhesion, and thus to make strippable shields that are less rubbery and thus easier to process than current formulations utilising nitrile rubbers.

The composition of matter in accordance with the invention comprises:

- a base polymer which is a copolymer of ethylene with a mono-unsaturated ester;

- conductive carbon black in an amount to give the composition an electrical resistivity below 500 Ωm; and
- as an adhesion-adjusting additive, 1–20% by weight of the base polymer of a copolymer which consists essentially of ethylene and a comonomer having in its molecule at least one carbon-oxygen dipole, said copolymer having a molecular weight less than 20,000 Daltons but a Mettler drop point higher than 30° C.

The invention includes an electric power cable having at least one conductor, insulation selected from the group consisting of cross-linked polyethylene and the ethylene copolymer rubbers, a dielectric shield and a surrounding jacket, said dielectric shield being of the composition specified in the preceding paragraph.

The invention also includes the use of a copolymer which consists essentially of ethylene and a comonomer having in its molecule at least one carbon-oxygen dipole, said copolymer having a molecular weight less than 20,000 Daltons but a melting point higher than 30° C., as an adhesion-adjusting additive in strippable shield composition for electric cables comprising a base polymer which is a copolymer of ethylene with a mono-unsaturated ester and a conductive carbon black in an amount to give the composition an electrical resistivity below 500 Ωm.

DESCRIPTION OF THE PREFERRED EMBODIMENTS

Preferably the base polymer is an EVA, but the invention is also applicable for base polymers such as ethylene-ethyl acrylate, ethylene-methyl acrylate and ethylene-methyl methacrylate copolymers and ternary (or higher-order) copolymers containing relatively small amounts of at least one additional monomer. Whereas for prior-art compositions in which the additive is a nitrile rubber, an EVA with a vinyl acetate content of at least 33% and an additive content of about 30% would be recommended for use with crosslinked polyethylene insulation (or an EVA with a vinyl acetate content of 40 if the additive level were only 5%), in the practice of the present invention a vinyl acetate content of about 33% is often satisfactory in terms of adhesion with an additive content of about 5% and this is preferred for giving the composition less rubbery physical properties; similarly for use with insulation based on EPR or EPDM, in the practice of the present invention an EVA content of about 40% is often sufficient and preferred at an additive level about 5%.

The invention does not require alteration to current practice regarding the types and quantity of carbon black to be used, and conventional types and proportions may be used. Preferably the resistivity of the composition is in the range from 0.1 to the maximum of 500 Ωm and preferably between 5 and 100 Ωm.

The carbon-oxygen dipole in the adhesion-adjusting additive may be a C—O single-bond (ether) dipole, a C=O double-bond (carbonyl) dipole or a C:O—O ester dipole, and more than one such dipole of the same or different kinds may be present in the comonomer molecule. Thus the comonomer molecule may, inter alia be vinyl acetate, ethyl acrylate, methyl- or ethyl-methacrylate, maleic anhydride and carbon monoxide. Monomers with free carboxylic acid groups are not recommended because their use might entail a risk of introducing ionic contaminants into the composition and from there into the insulation. The more polar comonomers and most especially vinyl acetate are preferred, partly because, as a general rule, a smaller proportion of the comonomer will be needed.

The proportion of the adhesion-adjusting additive required naturally varies with its polarity and other characteristics, but will typically be in the range from about 1 to about 20%—preferably in the lower part of this range, say about 2–10%, for the more polar additives such as the EVA's. It should be noted that these additives are generally less polar than the base polymer, in contrast to NBR which is much more polar, so that this observation is contrary to any supposition that the additives function by incompatibility with the base polymer.

The invention includes an electric power cable having at least one conductor, insulation selected from the group consisting of cross-linked polyethylene and the ethylene copolymer rubbers, a dielectric shield and a surrounding protective layer (such as a polymeric jacket and/or a layer of metal wires), said dielectric shield being of the composition previously defined.

Ethylene copolymer rubbers for use in the cable insulation include conventional EPR and EPDM rubbers, but also include copolymers with higher olefins (such as octene) that have recently become available through the application of "single-site" metallocene catalysts.

EXAMPLES

The compositions tabulated below were made up by the procedure set out after the table, and made up into moulded plaques measuring 150 mm square by 2 mm thick, one face being bonded to an XLPE block of the same dimensions and the two compositions cured together in the press for 20 min at 180° C. Selected compositions only were made up in larger quantities by a similar procedure and dual-extruded under standard commercial conditions for the respective materials onto sample cables with either XLPE or EPR insulation having an external diameter of 20 mm to form a dielectric screen 1.0 mm thick. In each case adhesion was measured by the peel strength tests detailed below. Identification of ingredients also follows after the Table. In the table, numbered Examples are in accordance with the invention; lettered Examples are for comparison.

TABLE

| Example | A | B | 1 | 2 |
|---|---|---|---|---|
| base polymer type | EVA 40 | EVA 33 | EVA 40 | EVA 33 |
| base polymer - parts | 62.3 | 62.3 | 56.3 | 56.3 |
| additive type | none | none | AC405T | AC405T |
| additive - parts | — | — | 5 | 5 |
| carbon black - parts | 36 | 36 | 37 | 37 |
| process aid - parts | 1 | 1 | 1 | 1 |
| antioxidant - parts | 0.7 | 0.7 | 0.7 | 0.7 |
| peroxide - parts | 0.8 | 0.8 | 0.8 | 0.8 |
| plaque adhesion: | | | | |
| kN/m | 4.2 | 6.65 | 3.5 | 5.25 |
| lb per ½ inch | 12 | 19 | 10 | 15 |
| **Example** | **3** | **4** | **5** | **6** |
| base polymer type | EVA 40 | EVA 40 | EVA 33 | EVA 33 |
| base polymer - parts | 53.8 | 56.3 | 56.3 | 58.5 |
| additive type | AC405T | AC405S | AC405S | AC400 |
| additive - parts | 7.5 | 5 | 5 | 2.5 |
| carbon black - parts | 37 | 37 | 37 | 37 |
| process aid - parts | 1 | 1 | 1 | 1 |
| antioxidant - parts | 0.7 | 0.7 | 0.7 | 0.7 |
| peroxide - parts | 0.8 | 0.8 | 0.8 | 0.8 |
| plaque adhesion: | | | | |
| kN/m | 3.85 | 2.6 | 4.55 | 3.5 |
| lb per ½ inch | 11 | 7.5 | 13 | 10 |
| **Example** | **7** | **8** | **9** | **10** |
| base polymer type | EVA 40 | EVA 33 | EVA 40 | EVA 33 |
| base polymer - parts | 58.5 | 56.3 | 56.3 | 53.3 |
| additive type | AC400 | AC400 | AC400 | AC400 |
| additive - parts | 2.5 | 5 | 5 | 7.5 |
| carbon black - parts | 37 | 37 | 37 | 37 |
| process aid - parts | 1 | 1 | 1 | 1 |
| antioxidant - parts | 0.7 | 0.7 | 0.7 | 0.7 |
| peroxide - parts | 0.8 | 0.8 | 0.8 | 0.8 |
| plaque adhesion: | | | | |
| kN/m | 3.5 | 3.15 | 1.4 | 2.8 |
| lb per ½ inch | 10 | 9 | 4 | 8 |
| **Example** | **11** | **12** | **13** | **14** |
| base polymer type | EVA 40 | EVA 33 | EVA 40 | EVA 33 |
| base polymer - parts | 53.3 | 51.3 | 56.3 | 56.3 |
| additive type | AC400 | AC400 | AC430 | AC430 |
| additive - parts | 7.5 | 10 | 5 | 5 |
| carbon black - parts | 37 | 37 | 37 | 37 |
| process aid - parts | 1 | 1 | 1 | 1 |
| antioxidant - parts | 0.7 | 0.7 | 0.7 | 0.7 |
| peroxide - parts | 0.8 | 0.8 | 0.8 | 0.8 |
| plaque adhesion: | | | | |
| kN/m | 2.6 | 5.1 | 1.4 | 5.4 |
| lb per ½ inch | 7.5 | 14.5 | 4 | 15.5 |
| **Example** | **15** | **16** | **17** | **18** |
| base polymer type | EVA 33 | EVA 40 | EVA 33 | EVA 40 |
| base polymer - parts | 56.3 | 56.3 | 56.3 | 56.3 |
| additive type | AC580 | AC580 | AC575 | AC575 |
| additive - parts | 5 | 5 | 5 | 5 |
| carbon black - parts | 37 | 37 | 37 | 37 |
| process aid - parts | 1 | 1 | 1 | 1 |
| antioxidant - parts | 0.7 | 0.7 | 0.7 | 0.7 |
| peroxide - parts | 0.8 | 0.8 | 0.8 | 0.8 |
| plaque adhesion: | | | | |
| kN/m | 5.8 | 2.1 | 5.95 | 2.8 |
| lb per ½ inch | 16.5 | 6 | 17 | 8 |
| **Example** | **19** | **C** | **D*** | **E*** |
| base polymer type | EVA 33 | EVA 33 | EVA 50 | EVA 40 |
| base polymer - parts | 56.3 | 56.3 | 61.5 | 62 |
| additive type | AC830 | 500W | none | none |
| additive - parts | 5 | 5 | — | — |
| carbon black - parts | 37 | 37 | 36 | 35.4 |
| process aid - parts | 1 | 1 | 1 | 1 |
| antioxidant - parts | 0.7 | 0.7 | 0.5 | 0.7 |
| peroxide - parts | 0.8 | 0.8 | 1 | 0.09 |
| plaque adhesion: | | | | |
| kN/m | 6.3 | 7.1 | 1.4 | 4.2 |
| lb per ½ inch | 18 | 20.5 | 4 | 12 |
| cable adhesion: | | | | |
| Insulation type | | | EPR | XLPE |
| kN/m | | | 2–3 | 5–6 |
| lb per ½ inch | | | 6–9 | 15–18 |

| Example | 20 | 21 | F |
|---|---|---|---|
| base polymer type | EVA 40 | EVA 33 | EVA 33 |
| base polymer - parts | 57.34 | 57.6 | 41.5 |
| additive type | AC400 | AC400 | NBR |
| additive - parts | 4.96 | 4.96 | 20 |
| carbon black - parts | 35.71 | 35.71 | 36 |
| process aid - parts | 0.69 | 0.79 | 1.0 |

TABLE-continued

| | | | |
|---|---|---|---|
| antioxidant - parts | 0.7 | 0.5 | 0.5 |
| peroxide - parts | 0.79 | 0.79 | 1.0 |
| plaque adhesion: | | | |
| kN/m | 1.4 | 3.15 | 1.4 |
| lb per ½ inch | 4 | 9 | 4 |
| cable adhesion: | | | |
| insulation type | EPR | XLPE | XLPE |
| kN/m | 3.85 | 5.6 | 4–5 |
| lb per ½ inch | 11 | 16 | 11 to 15 |
| Example | 22 | 23 | F |
| base polymer type | EMA 35 | EMA 35 | EMA 35 |
| base polymer - parts | 56.3 | 51.3 | 60.3 |
| additive type | AC 400 | AC 400 | none |
| additive - parts | 5 | 10 | — |
| carbon black - parts | 37 | 37 | 37 |
| process aid - parts | 1 | 1 | 1 |
| antioxidant - parts | 0.7 | 0.7 | 0.7 |
| peroxide - parts | 0.8 | 0.8 | 0.8 |
| plaque adhesion: | | | |
| kN/m | 3.6 | 2.9 | 8.0 |
| lb per ½ inch | 8 | 6.5 | 18 |

*Comparison Examples D and E are known compositions for use with insulation of EPR and XLPE respectively - compare with Examples 20 and 21 respectively.

Mixing procedure

Batches of about 1350 g (3.3 lb) of each composition were made up using a Farrell model BR Banbury mixer with a capacity of 1.57 1. Half the base polymer and half the adhesion-adjusting additive were first introduced into the cold Banbury and fluxed at its middle speed setting; the processing aid and antioxidant were added together, followed immediately by the carbon black. The ram was lowered and raised and the remainder of the base polymer and adhesion-adjusting additive were added and blending continued until the temperature reached 135° C. (275° F.). The material was discharged and cooled to ambient temperature, and then half of it reintroduced to the cold Banbury, fluxed and the peroxide added, followed immediately by the remainder of the mixture; blending was continued until the temperature reached 110° C. (230° F.) and the mixture discharged and promptly moulded.

Ingredients

EVA 33: ethylene-vinyl acetate copolymer, 33% vinyl acetate content, 43 melt index, sold under the Trademark ELVAX as ELVAX 150.

EVA 40: ethylene-vinyl acetate copolymer, 40% vinyl acetate content, 52 melt index, sold under the Trademark ELVAX as ELVAX 40 W.

EVA 50: ethylene-vinyl acetate copolymer, 50% vinyl acetate content, 25 Mooney viscosity, sold under the trademark Levapren as LEVAPREN 500.

AC400: ethylene-vinyl acetate copolymer of molecular weight about 2500 Daltons, 13% vinyl acetate content, 920° C. (198° F.) Mettler drop point, sold by Allied Signal under this designation.

AC405T: ethylene-vinyl acetate copolymer of molecular weight about 2600 Daltons, 6% vinyl acetate content, 102° C. (216° F.) Mettler drop point, sold by Allied Signal under this designation.

AC405S: ethylene-vinyl acetate copolymer of molecular weight about 2600 Daltons, 11% vinyl acetate content, 94° C. (201° F.) Mettler drop point, sold by Allied Signal under this designation.

AC430: ethylene-vinyl acetate copolymer of molecular weight about 2100 Daltons, 26% vinyl acetate content, 75° C. (167° F.) Mettler drop point, sold by Allied Signal under this designation.

AC575: low-molecular weight ethylene-maleic anhydride copolymer, 105° C. (201° F.) Mettler drop point, sold by Allied Signal under this designation.

AC580: ethylene-acrylic acid copolymer of molecular weight about 1000, 95° C. (203° F.) Mettler drop point, sold by Allied Signal under this designation.

AC830: low-molecular weight ethylene-carbon monoxide copolymer, 96° C. (205° F.) Mettler drop point, sold by Allied Signal under this designation.

500W: an ethylene-vinyl acetate copolymer with a vinyl acetate content of about 14%, molecular weight about 20,400 Daltons and D.S.C. melting point 87° C., sold by DuPont under this designation.

EMA 35: an ethylene-methyl acrylate of methyl acrylate content 35% by weight and melt index 5, sold under the trademark ATOCHEM as Atochem MA05 carbon black: a low surface area medium structure furnace black with a dibutyl phthalate number about 125.

process aid: stearic acid antioxidant: a polymerised dihydroquinoline antioxidant peroxide: dicumyl peroxide.

Adhesion tests

Plaque samples were tested by cutting completely through the thickness of the layer of the experimental shield composition in parallel lines to define a strip 12.5 mm (½ inch) wide; one end was lifted and turned back 180° to lie along the surface of the portion still adhered, and the force required to peel at a rate of 0.0085 m/s (20 in/min) measured; peel strength was calculated in N/m and pounds per ½ inch.

Cable samples were tested generally in the same way, with the cuts parallel to the cable axis, but the peeling force was applied an measured in a direction at 90° to the surface, instead of 180°. Because of the different preparation and crosslinking routes, as well as this difference in pulling direction, plaque and cable peel strengths are not directly comparable but plaque tests do provide a useful guide in the development process: typically cable peel force will prove to be roughly twice the plaque peel force.

What is claimed is:

1. A method for the formation of a strippable semiconductive shield comprising the steps of adding a conductive carbon black in an amount sufficient to give the strippable semiconductive shield an electrical resistivity below 500 Ωm and an adhesive-adjusting additive which consist essentially of ethylene and a comonomer having in its molecule at least one carbon-oxygen dipole, said copolymer having a molecular weight less than 20,000 daltons, to a base polymer which is a copolymer of ethylene with a mono-unsaturated ester;

blending said conductive carbon black, adhesion-adjusting additive and base polymer and extruding raid blended conducting carbon black, adhesive-adjusting additive and base polymer to form the strippable semiconductive shield.

2. The method of claim 1 where said base polymer is an EVA.

3. The method of claim 1 wherein said base polymer is selected from the group consisting of ethylene-ethyl acrylate, ethylene-methyl acrylate, ethylene-methyl methacrylate copolymers and ternary (or higher order) copolymers containing relatively small amounts of at least one additional monomer.

4. The method of claim 2 wherein the resistivity is in the range from 5 to 100 Ωm.

5. The method of claim 3 wherein the resistivity is in the range from 5 to 100 Ωm.

6. The method of claim 1 wherein the adhesion-adjusting additive comprises a comonomer with at least one C—O single-bond (ether) dipole.

7. The method of claim 1 wherein the adhesion-adjusting additive comprises a comonomer with at least one C═O double bond (carbonyl) dipole.

8. The method of claim 1 wherein the adhesion-adjusting additive comprises a comonomer with at least one C:O—O (ester) dipole.

9. The method of claim 1 wherein the adhesion-adjusting additive comprises 1 to 20 weight percent of the strippable semiconducting shield.

10. The method of claim 9 wherein said adhesion-adjusting additive comprises 2–10 weight percent of the strippable semiconductive shield.

11. The method of claim 2 wherein the EVA base polymer has a vinyl acetate content of about 33%.

12. The method of claim 1 wherein its adhesion-adjusting additives is an EVA.

13. The method claim 12 wherein the adhesion-adjusting EVA has a vinyl acetate composition of about 12%.

14. The method of claim 12 where the adhesion adjusting EVA has a vinyl acetate comprised of about 14%.

15. The method of claim 12 wherein the adhesion adjusting EVA has a vinyl acetate composition of about 11%.

* * * * *

UNITED STATES PATENT AND TRADEMARK OFFICE

CERTIFICATE OF CORRECTION

PATENT NO. : 6,294,256 B1
DATED : September 25, 2001
INVENTOR(S) : Easter

It is certified that error appears in the above-identified patent and that said Letters Patent is hereby corrected as shown below:

Please substitute the specification and the claims with the new specification and new claims.

Signed and Sealed this

Thirteenth Day of June, 2006

JON W. DUDAS
*Director of the United States Patent and Trademark Office*

(12) United States Patent
Easter

(10) Patent No.: US 6,294,256 B1
(45) **Date of Patent: *Sep. 25, 2001**

(54) COMPOSITIONS AND ELECTRIC CABLES

(75) Inventor: Mark Richard Easter, Indianapolis, IN (US)

(73) Assignee: BICC General Cable Industries, Inc., Highland Heights, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,028

(22) PCT Filed: Nov. 12, 1997

(86) PCT No.: PCT/GB97/03098

§ 371 Date: Apr. 16, 1999

§ 102(e) Date: Apr. 16, 1999

(87) PCT Pub. No.: WO98/21278

PCT Pub. Date: May 22, 1998

(30) Foreign Application Priority Data

Nov. 14, 1996 (GB) ............................................. 9623733
Aug. 30, 1997 (GB) ............................................. 9718345

(51) Int. Cl.[7] .......................... B32B 15/00; C08K 3/04; H01B 7/00

(52) U.S. Cl. ....................... 428/379; 428/372; 428/383; 524/495; 174/106 SC; 174/120 SC; 174/110 PM

(58) Field of Search ................... 524/495; 174/106 SC, 174/120 SC, 105 SC, 110 PM, 120 SR; 428/372, 379, 383

(56) References Cited

U.S. PATENT DOCUMENTS

| | | |
|---|---|---|
| 4,150,193 | 4/1979 | Burns, Jr. . |
| 4,226,823 | 10/1980 | Jansson et al. . |
| 4,246,023 | 1/1981 | Savov et al. . |
| 4,246,142 | 1/1981 | Ongchin . |
| 4,412,938 | 11/1983 | Kakizaki et al. . |
| 4,493,787 | 1/1985 | Taniguchi et al. . |
| 4,648,986 | 3/1987 | Kotani et al. . |
| 4,993,107 | 2/1991 | Zoni . |

FOREIGN PATENT DOCUMENTS

| | | |
|---|---|---|
| 0 210 425 A2 | 2/1987 | (EP) . |
| 0 420 271 B1 | 4/1991 | (EP) . |
| A-60-260637 | 12/1985 | (JP) . |

*Primary Examiner*—William Krynski
*Assistant Examiner*—J. M. Gray
(74) *Attorney, Agent, or Firm*—Blank Rome Comisky & McCauley LLP

(57) ABSTRACT

A composition of matter for use as dielectric shield in an electric power cable having insulation of XLPE, EPR or EPDM comprises: a base polymer which is a copolymer of ethylene with a mono-unsaturated ester; conductive carbon black in an amount to give the composition an electrical resistivity below 500 Am; and as an adhesion-adjusting additive, 1–20% by weight of the base polymer of a copolymer which consists essentially of ethylene and a comonomer having in its molecule at least one carbon-oxygen dipole, said copolymer having a molecular weight less than 20,000 Daltons but a melting point higher than 30° C. This new class of additive permits use of EVA'S with lower vinyl acetate content than prior art additives and so enables the composition to have less rubbery physical properties.

36 Claims, No Drawings

COMPOSITIONS AND ELECTRIC CABLES

FIELD OF THE INVENTION

This invention relates to compositions of matter for use in making electric cables and to cables in which they are used. More particularly, it relates to compositions for use as "semiconducting" dielectric shield (also called core shield, dielectric screen or core screen) materials in power cables with crosslinked polymeric insulation, primarily at "medium" voltages, say from around 10 kV to 75 or perhaps 100 kV.

DESCRIPTION OF RELATED ART

While some customers desire to have polymeric cables in which the dielectric screen is securely bonded to the insulation so that stripping is only possible by use of a cutting tool that removes a little insulation with the shield, because they believe that this minimises risk of electrical breakdown at the interface, others prefer a "strippable" shield with limited adhesion to the insulation so that it can be peeled cleanly away (generally after cutting "tramlines" part-way through its thickness) without removing any insulation. Current strippable screen compositions for use over insulation of crosslinked polyethylene (XLPE) or one of the ethylene copolymer rubbers (EPR or EPDM, the latter incorporating a diene comonomer to provide unsaturation) are usually based on an ethylene/vinyl acetate copolymer (EVA) rendered conductive with an appropriate type and amount of carbon black: the required peel characteristics can be obtained by selecting an EVA with a high enough vinyl acetate content, with or without using a nitrile rubber as an adhesion-adjusting additive. Formulations using these additives (e.g. Ongchin U.S. Pat. Nos. 4,246,023 and 4,246,142, Burns et al European patent 0,420,271B, Kakizaki U.S. Pat. No. 4,412,938 and Jansson U.S. Pat. No. 4,226,823) are expensive proprietary material and in the present applicants' experience do not sufficiently avoid a requirement to use EVA's of relatively high vinyl acetate content to achieve the optimum adhesion level, with the result that all the strippable screen compositions in general commercial use are more rubbery than is desirable.

Many alternative adhesion-adjusting additives have been proposed, for example waxy aliphatic hydrocarbons (Watanabe et al U.S. Pat. No. 4,993,107); low-molecular weight ethylene homopolymers (Burns Jr U.S. Pat. No. 4,150,193); various silicone compounds (Taniguchi U.S. Pat. No. 4,493,787); chlorosulfonated polyethylene, ethylene-propylene rubber, polychloroprene, styrene-butadiene rubber, natural rubber, polyester rubber, and polyurethane rubber (all in Jansson U.S. Pat. No. 4,226,823); but none of these, except paraffin waxes, seems to have found commercial acceptance.

SUMMARY OF THE INVENTION

This invention is based on the discovery of a new and unexpected class of adhesion-adjusting additive which surprisingly allows shield compositions to be formulated, if desired, utilizing EVA's of lower vinyl acetate content for a given level of adhesion, and thus to make strippable shields that are less rubbery and thus easier to process than current formulations utilising nitrile rubbers.

The composition of matter in accordance with the invention comprises:

- a base polymer which is a copolymer of ethylene with a mono-unsaturated ester;

- conductive carbon black in an amount to give the composition an electrical resistivity below 500 Ωm; and
- as an adhesion-adjusting additive, 1–20% by weight of the base polymer of a copolymer which consists essentially of ethylene and a comonomer having in its molecule at least one carbon-oxygen dipole, said copolymer having a molecular weight less than 20,000 Daltons but a Mettler drop point higher than 30° C.

The invention includes an electric power cable having at least one conductor, insulation selected from the group consisting of cross-linked polyethylene and the ethylene copolymer rubbers, a dielectric shield and a surrounding jacket, said dielectric shield being of the composition specified in the preceding paragraph.

The invention also includes the use of a copolymer which consists essentially of ethylene and a comonomer having in its molecule at least one carbon-oxygen dipole, said copolymer having a molecular weight less than 20,000 Daltons but a melting point higher than 30° C., as an adhesion-adjusting additive in strippable shield composition for electric cables comprising a base polymer which is a copolymer of ethylene with a mono-unsaturated ester and a conductive carbon black in an amount to give the composition an electrical resistivity below 500 Ωm.

DESCRIPTION OF THE PREFERRED EMBODIMENTS

Preferably the base polymer is an EVA, but the invention is also applicable for base polymers such as ethylene-ethyl acrylate, ethylene-methyl acrylate and ethylene-methyl methacrylate copolymers and ternary (or higher-order) copolymers containing relatively small amounts of at least one additional monomer. Whereas for prior-art compositions in which the additive is a nitrile rubber, an EVA with a vinyl acetate content of at least 33% and an additive content of about 30% would be recommended for use with crosslinked polyethylene insulation (or an EVA with a vinyl acetate content of 40 if the additive level were only 5%), in the practice of the present invention a vinyl acetate content of about 33% is often satisfactory in terms of adhesion with an additive content of about 5% and this is preferred for giving the composition less rubbery physical properties; similarly for use with insulation based on EPR or EPDM, in the practice of the present invention an EVA content of about 40% is often sufficient and preferred at an additive level about 5%.

The invention does not require alteration to current practice regarding the types and quantity of carbon black to be used, and conventional types and proportions may be used. Preferably the resistivity of the composition is in the range from 0.1 to the maximum of 500 Ωm and preferably between 5 and 100 Ωm.

The carbon-oxygen dipole in the adhesion-adjusting additive may be a C—O single-bond (ether) dipole, a C═O double-bond (carbonyl) dipole or a C:O—O ester dipole, and more than one such dipole of the same or different kinds may be present in the comonomer molecule. Thus the comonomer molecule may, inter alia be vinyl acetate, ethyl acrylate, methyl- or ethyl-methacrylate, maleic anhydride and carbon monoxide. Monomers with free carboxylic acid groups are not recommended because their use might entail a risk of introducing ionic contaminants into the composition and from there into the insulation. The more polar comonomers and most especially vinyl acetate are preferred, partly because, as a general rule, a smaller proportion of the comonomer will be needed.

The proportion of the adhesion-adjusting additive required naturally varies with its polarity and other characteristics, but will typically be in the range from about 1 to about 20%—preferably in the lower part of this range, say about 2–10%, for the more polar additives such as the EVA's. It should be noted that these additives are generally less polar than the base polymer, in contrast to NBR which is much more polar, so that this observation is contrary to any supposition that the additives function by incompatibility with the base polymer.

The invention includes an electric power cable having at least one conductor, insulation selected from the group consisting of cross-linked polyethylene and the ethylene copolymer rubbers, a dielectric shield and a surrounding protective layer (such as a polymeric jacket and/or a layer of metal wires), said dielectric shield being of the composition previously defined.

Ethylene copolymer rubbers for use in the cable insulation include conventional EPR and EPDM rubbers, but also include copolymers with higher olefins (such as octene) that have recently become available through the application of "single-site" metallocene catalysts.

EXAMPLES

The compositions tabulated below were made up by the procedure set out after the table, and made up into moulded plaques measuring 150 mm square by 2 mm thick, one face being bonded to an XLPE block of the same dimensions and the two compositions cured together in the press for 20 min at 180° C. Selected compositions only were made up in larger quantities by a similar procedure and dual-extruded under standard commercial conditions for the respective materials onto sample cables with either XLPE or EPR insulation having an external diameter of 20 mm to form a dielectric screen 1.0 mm thick. In each case adhesion was measured by the peel strength tests detailed below. Identification of ingredients also follows after the Table. In the table, numbered Examples are in accordance with the invention; lettered Examples are for comparison.

TABLE

| Example | A | B | 1 | 2 | 3 | 4 | 5 | 6 | 7 | 8 |
|---|---|---|---|---|---|---|---|---|---|---|
| base polymer type | EVA 40 | EVA 33 | EVA 40 | EVA 33 | EVA 40 | EVA 40 | EVA 33 | EVA 33 | EVA 40 | EVA 33 |
| base polymer-parts | 62.3 | 62.3 | 56.3 | 56.3 | 53.8 | 56.3. | 56.3 | 58.5 | 58.5 | 56.3 |
| additive type | none | none | AC405T | AC405T | AC405T | AC405S | AC405S | AC400 | AC400 | AC400 |
| additive-parts | — | — | 5 | 5 | 7.5 | 5 | 5 | 2.5 | 58.5 | 56.3 |
| carbon black-parts | 36 | 36 | 37 | 37 | 37 | 37 | 37 | 37 | 37 | 37 |
| process aid-parts | 1 | 1 | 1 | 1 | 1 | 1 | 1 | 1 | 1 | 1 |
| antioxidant-parts | 0.7 | 0.7 | 0.7 | 0.7 | 0.7 | 0.7 | 0.7 | 0.7 | 0.7 | 0.7 |
| peroxide-parts | 0.8 | 0.8 | 0.8 | 0.8 | 0.8 | 0.8 | 0.8 | 0.8 | 0.8 | 0.8 |
| plaque adhesion: | | | | | | | | | | |
| kN/m | 4.2 | 6.65 | 3.5 | 5.25 | 3.85 | 2.6 | 4.5 | 3.5 | 3.5 | 3.15 |
| lb per ½ inch | 12 | 19 | 10 | 15 | 11 | 7.5 | 13 | 10 | 10 | 9 |

| Example | 9 | 10 | 11 | 12 | 13 | 14 | 15 | 16 | 17 | 18 |
|---|---|---|---|---|---|---|---|---|---|---|
| base polymer type | EVA 40 | EVA 33 | EVA 40 | EVA 33 | EVA 40 | EVA 33 | EVA 33 | EVA 40 | EVA 33 | EVA 40 |
| base polymer-parts | 56.3 | 53.3 | 53.3 | 51.3 | 56.3 | 56.3 | 56.3 | 56.3 | 56.3 | 56.3 |
| additive type | AC400 | AC400 | AC400 | AC400 | AC430 | AC430 | AC580 | AC580 | AC575 | AC575 |
| additive-parts | 5 | 7.5 | 7.5 | 10 | 5 | 5 | 5 | 5 | 5 | 5 |
| carbon black-parts | 37 | 37 | 37 | 37 | 37 | 37 | 37 | 37 | 37 | 37 |
| process aid-parts | 1 | 1 | 1 | 1 | 1 | 1 | 1 | 1 | 1 | 1 |
| antioxidant-parts | 0.7 | 0.7 | 0.7 | 0.7 | 0.7 | 0.7 | 0.7 | 0.7 | 0.7 | 0.7 |
| peroxide-parts | 0.8 | 0.8 | 0.8 | 0.8 | 0.8 | 0.8 | 0.8 | 0.8 | 0.8 | 0.8 |
| plaque adhesion: | | | | | | | | | | |
| kN/m | 1.4 | 2.8 | 2.6 | 5.1 | 1.4 | 5.4 | 5.8 | 2.1 | 5.95 | 2.8 |
| lb per ½ inch | 4 | 8 | 7.5 | 14.5 | 4 | 15.5 | 16.5 | 6 | 17 | 8 |

| Example | 19 | C | D* | E* | 20 | 21 | F | 22 | 23 | F |
|---|---|---|---|---|---|---|---|---|---|---|
| base polymer type | EVA 33 | EVA 33 | EVA 50 | EVA 40 | EVA 40 | EVA 33 | EVA 33 | EMA 35 | EMA 35 | EMA 35 |
| base polymer-parts | 56.3 | 56.3 | 61.5 | 62 | 57.34 | 57.6 | 41.5 | 56.3 | 51.3 | 60.3 |
| additive type | AC830 | 500W | none | none | AC400 | AC400 | NBR | AC 400 | AC 400 | none |
| additive-parts | 5 | 5 | — | — | 4.96 | 4.96 | 20 | 5 | 10 | — |
| carbon black-parts | 37 | 37 | 36 | 35.4 | 35.71 | 35.71 | 36 | 37 | 37 | 37 |
| process aid-parts | 1 | 1 | 1 | 1 | 0.69 | 0.79 | 1.0 | 1 | 1 | 1 |
| antioxidant-parts | 0.7 | 0.7 | 0.5 | 0.7 | 0.7 | 0.5 | 0.5 | 0.7 | 0.7 | 0.7 |
| peroxide-parts | 0.8 | 0.8 | 1 | 0.09 | 0.79 | 0.79 | 1.0 | 0.8 | 0.8 | 0.8 |
| plaque adhesion: | | | | | | | | | | |
| kN/m | 6.3 | 7.1 | 1.4 | 4.2 | 1.4 | 3.15 | 1.4 | 3.6 | 2.9 | 8.0 |
| lb per ½ inch | 18 | 20.5 | 4 | 12 | 4 | 9 | 4 | 8 | 6.5 | 18 |
| cable adhesion: | | | | | | | | | | |
| insulation type | | | EPR | XLPE | EPR | XLPE | XLPE | | | |
| kN/m | | | 2–3 | 5–6 | 3.85 | 5.6 | 4–5 | | | |
| lb per ½ inch | | | 6–9 | 15–18 | 11 | 16 | 11 to 15 | | | |

*Comparison Examples D and E are known compositions for use with insulation of EPR and XLPE respectively-compare with Examples 20 and 21 respectively.

Mixing Procedure

Batches of about 1350 g (3.3 lb) of each composition were made up using a Farrell model BR Banbury mixer with a capacity of 1.57 l. Half the base polymer and half the adhesion-adjusting additive were first introduced into the cold Banbury and fluxed at its middle speed setting; the processing aid and antioxidant were added together, followed immediately by the carbon black. The ram was lowered and raised and the remainder of the base polymer and adhesion-adjusting additive were added and blending continued until the temperature reached 135° C. (275° F.). The material was discharged and cooled to ambient temperature, and then half of it reintroduced to the cold Banbury, fluxed and the peroxide added, followed immediately by the remainder of the mixture; blending was continued until the temperature reached 110° C. (230° F.) and the mixture discharged and promptly moulded.

Ingredients

EVA 33: ethylene-vinyl acetate copolymer, 33% vinyl acetate content, 43 melt index, sold under the Trademark ELVAX as ELAX 150.

EVA 40: ethylene-vinyl acetate copolymer, 40% vinyl acetate content, 52 melt index, sold under the Trademark ELVAX as ELVAX 40W.

EVA 50: ethylene-vinyl acetate copolymer, 50% vinyl acetate content, 25 Mooney viscosity, sold under the trademark Levapren as LEVAPREN 500.

AC400: ethylene-vinyl acetate copolymer of molecular weight about 2500 Daltons, 13% vinyl acetate content, 92° C. (198° F.) Mettler drop point, sold by Allied Signal under this designation.

AC405T: ethylene-vinyl acetate copolymer of molecular weight about 2600 Daltons, 6% vinyl acetate content, 102° C. (216° F.) Mettler drop point, sold by Allied Signal under this designation.

AC405S: ethylene-vinyl acetate copolymer of molecular weight about 2600 Daltons, 11% vinyl acetate content, 94° C. (201° F.) Mettler drop point, sold by Allied Signal under this designation.

AC430: ethylene-vinyl acetate copolymer of molecular weight about 2100 Daltons, 26% vinyl acetate content, 75° C. (167° F.) Mettler drop point, sold by Allied Signal under this designation.

AC575: low-molecular weight ethylene-maleic anhydride copolymer, 105° C. (201° F.) Mettler drop point, sold by Allied Signal under this designation.

AC580: ethylene-acrylic acid copolymer of molecular weight about 1000, 95° C. (203° F.) Mettler drop point, sold by Allied Signal under this designation.

AC830: low-molecular weight ethylene-carbon monoxide copolymer, 96° C. (205° F.) Mettler drop point, sold by Allied Signal under this designation.

500W: an ethylene-vinyl acetate copolymer with a vinyl acetate content of about 14%, molecular weight about 20,400 Daltons and D.S.C. melting point 87° C., sold by DuPont under this designation.

EMA 35: an ethylene-methyl acrylate of methyl acrylate content 35% by weight and melt index 5, sold under the trademark ATOCHEM as Atochem MA05 carbon black: a low surface area medium structure furnace black with a dibutyl phthalate number about 125.

process aid: stearic acid antioxidant: a polymerised dihydroquinoline antioxidant peroxide: dicumyl peroxide.

Adhesion Tests

Plaque samples were tested by cutting completely through the thickness of the layer of the experimental shield composition in parallel lines to define a strip 12.5 mm (½ inch) wide; one end was lifted and turned back 180° to lie along the surface of the portion still adhered, and the force required to peel at a rate of 0.0085 m/s (20 in/min) measured; peel strength was calculated in N/m and pounds per ½ inch.

Cable samples were tested generally in the same way, with the cuts parallel to the cable axis, but the peeling force was applied an measured in a direction at 90° to the surface, instead of 180°. Because of the different preparation and crosslinking routes, as well as this difference in pulling direction, plaque and cable peel strengths are not directly comparable but plaque tests do provide a useful guide in the development process: typically cable peel force will prove to be roughly twice the plaque peel force.

What is claimed is:

1. A composition of matter comprising:

a base polymer which is a copolymer of ethylene with a mono-unsaturated ester;

conductive carbon black in an amount to give the composition an electrical resistivity below 500 Ωm; and as an adhesion-adjusting additive, 1–20% by weight of the base polymer of a copolymer which consists essentially of ethylene and a comonomer having in its molecule at least one carbon-oxygen dipole, said copolymer having a molecular weight less than 20,000 Daltons but a Mettler drop point higher than 30° C.

2. A composition as claimed in claim 1 in which said base polymer is an EVA.

3. A composition as claimed in claim 1 in which said base polymer is selected from the group consisting of ethylene-ethyl acrylate, ethylene-methyl acrylate and ethylene-methyl methacrylate copolymers and ternary copolymers.

4. A composition as claimed in claim 1 having a resistivity in the range from 0.1 to 500 106 m.

5. A composition as claimed in claim 1 having a resistivity in the range from 5 to 100 106 m.

6. A composition as claimed in claim 1 in which said adhesion-adjusting additive comprises a comonomer with at least one C—O single bond (ether) dipole.

7. A composition as claimed in claim 1 in which said adhesion-adjusting additive comprises a comonomer with at least one C═O double-bond (carbonyl) dipole.

8. A composition as claimed in claim 1 in which said adhesion-adjusting additive comprises a comonomer with at least one C:O—O (ester) dipole.

9. A composition as claimed in claim 1 in which said adhesion-adjusting additive includes a comonomer selected from the group consisting of ethyl acetate, ethyl acrylate, methyl- and ethyl-methacrylate, maleic anhydride and carbon monoxide.

10. A composition as claimed in claim 1 comprising 1 to 20% of said adhesion-adjusting additive.

11. A composotion as claimed in claim 1 comprising 2–10% of said adhesion-adjusting additive wherein said adhesion-adjusting polymer is an adhesion-adjusting EAV.

12. The composition of claim 11 wherein said adhesion-adjustinfg EVA has a vinyl acetate content of about 6%.

13. An electric power cable having at least one conductor, insulation selected from the group consisting of cross-linked polyethylene and the ethylene copolymer rubbers, a dielectric shield and a surrounding protective layer, said dielectric shield being a composition comprising:

a base polymer which is a copolymer of ethylene with a mono-unsaturated ester;

conductive carbon black in an amount to give the composition an electrical resistivity below 500 Ωm; and as an adhesion-adjusting additive, 1–20% by weight of the base polymer of a copolymer which consists essentially of ethylene and a comonomer having in its molecule at lest one carbon-oxygen dipole, said copolymer having a molecular weight less than 20,000 Daltons but a Mettler drop point higher than 30° C.

14. A cable as claimed in claim 13 in which said base polymer is an EVA.

15. A cable as claimed in claim 14 comprising 2–10% of said adhesion-adjusting additive.

16. A cable as claimed in claim 13 in which said base polymer is selected from the group consisting of ethylene-ethyl acrylate, ethylene-methyl acrylate and ethylene-methyl methacrylate copolymers and ternary (or higher-order) copolymers containing relatively small amounts of at least one additional monomer.

17. A cable as claimed in claim 13 in which the insulation is of crosslinked polyethylene and said base polymer is an ethylene-vinyl acetate copolymer with a vinyl acetate content of about 33%.

18. A cable as claimed in claim 13 in which the insulation comprises EPR or EPDM and said base polymer is an EVA with a vinyl acetate content of about 40%.

19. A cable as claimed in claim 13 comprising 1 to about 20% of said adhesion-adjusting additive.

20. The cable of claim 19 wherein said adhesion-adjusting additive is an adhesion-adjusting EVA.

21. The cable of claim 20 wherein said adhesion-adjusting EVA has a vinyl acetate content of about 12%.

22. The cable of claim 20 wherein said adhesion-adjusting EVA has a vinyl acetate content of about 13%.

23. The cable of claim 20 wherein said adhesion-adjusting EVA has a vinyl acetate content of about 11%.

24. The cable of claim 20 wherein said adhesion-adjusting EVA has a vinyl acetate content of about 26%.

25. The cable of claim 20 wherein said adhesion-adjusting EVA has a vinyl acetate content of about 14%.

26. The cable of claim 20 wherein said adhesion-adjusting EVA has a vinyl acetate content of about 6%.

27. The cable of claim 13 wherein said adhesion-adjusting EVA has a vinyl acetate content of about 12%.

28. The cable of claim 13 wherein said adhesion-adjusting EVA has a vinyl acetate content of about 13%.

29. The cable of claim 13 wherein said adhesion-adjusting EVA has a vinyl acetate content of about 11%.

30. The cable of claim 13 wherein said adhesion-adjusting EVA has a vinyl acetate content of about 26%.

31. The cable of claim 13 wherein said adhesion-adjusting EVA has a vinyl acetate content of about 14%.

32. A method of adjusting adhesion in a strippable shield composition for electric cables, comprising adding an adhesion-adjusting amount of a copolymer which consists essentially of ethylene and a comonomer having in its molecule at least one carbon-oxygen dipole, said copolymer having a molecular weight less than 20,000 Daltons but a Mettler drop point higher than 30° C., with a strippable shield composition comprising a base polymer which is a copolymer of ethylene with a mono-unsaturated ester and a conductive carbon black in an amount to give the composition an electrical resistivity below 500 Ωm.

33. The method as claimed in claim 32 in which said base polymer is an EVA.

34. The method as claimed in claim 32 in which said base polymer is selected from the group consisting of ethylene-ethyl acrylate, ethylene-methyl acrylate and ethylene-methyl methacrylate copolymers and ternary copolymers.

35. The method as claimed in claim 32 comprising using 1 to about 20% of said adhesion-adjusting additive.

36. The method as claimed in claim 32 comprising using 2–10% of said adhesion-adjusting additive.

* * * * *